United States Patent [19]

Ohki et al.

[11] Patent Number: 4,595,294
[45] Date of Patent: Jun. 17, 1986

[54] POSITION DETECTING DEVICE

[75] Inventors: Hiroshi Ohki, Tokyo; Kenji Fujii, Chigasaki; Hidehiro Ogawa, Tokyo; Akio Takahama, Yokohama, all of Japan

[73] Assignee: Nippon Kogaku K.K., Tokyo, Japan

[21] Appl. No.: 420,124

[22] Filed: Sep. 20, 1982

[30] Foreign Application Priority Data

Sep. 26, 1981 [JP] Japan .................................. 56-151401

[51] Int. Cl.⁴ ............................................ G01B 11/14
[52] U.S. Cl. ..................................... 356/375; 356/152
[58] Field of Search ....................... 356/138, 152, 375; 250/561

[56] References Cited

FOREIGN PATENT DOCUMENTS 108616 7/1982 Japan .................................. 356/138
2078945 1/1982 United Kingdom ............... 356/375

Primary Examiner—F. L. Evans
Attorney, Agent, or Firm—Shapiro and Shapiro

[57] ABSTRACT

A conventional position detecting device for determining the position of a pattern having light and dark areas projected on a image sensor, in which the output signal from the image sensor is converted into a quantized signal through a sample and hold circuit. An improvement according to the invention is provided with a filter for cutting off the frequency components of the quantized signal above a clock frequency used for reading photoelectric outputs in the image sensor to convert the quantized signal into an analog signal to be used for determining the position of the pattern, whereby a high resolving power not limited by the length of each element of the image sensor is achieved.

7 Claims, 9 Drawing Figures

POSITION DETECTING DEVICE

BACKGROUND OF THE INVENTION

1. Field of the Invention

The present invention relates to a device for projecting a pattern having a light area and a dark area on an image sensor and detecting the position of said pattern on said image sensor, and more particularly to such position detecting device adapted for use in surveying instruments such as a theodolite or a level for detecting the inclination to a reference plane or in measuring instruments such as a collimater for detecting the angle thereof.

2. Description of the Prior Art

In a known device of this sort in which the pattern position is detected from the output signals of an image sensor composed of a linear array of plural charge-accumulating photoelectric converting elements, it is necessary to reduce the length of each element for improving the precision of position measurement since the output signals from such image sensor are digitized by the elements. However the length of each element is physically limited, and the resolving power of such device is therefore determined by the length of each element.

SUMMARY OF THE INVENTION

The object of the present invention is to provide a position detecting device not associated with such drawbacks and capable of achieving a high resolving power not limited by the length of each element of the image sensor.

According to the invention an improved position detecting device for determining the position of a pattern having a light area and dark area by projecting the pattern on an image sensor provided with a linear array of plural photoelectric converting elements, reading the output signals of the photoelectric converting elements in response to clock pulses of a first frequency, and forming a hold signal by holding the output signals of the photoelectric converting elements during an interval of the clock pulses of the first frequency thereby determining the position of said pattern on said image sensor comprises: filter means adapted for cutting off the frequency components of the hold signal at least above the first frequency and passing the remaining frequency components of the hold signal as an output signal; comparator means having a threshold level and adapted for comparing the output signal of the filter means with the threshold level and outputting a comparison signal in response to the result of the comparison; and timer means for measuring the time to the outputting of the comparison signal from the comparator means.

DETAILED DESCRIPTION OF THE PREFERRED EMBODIMENTS

Figure 1:
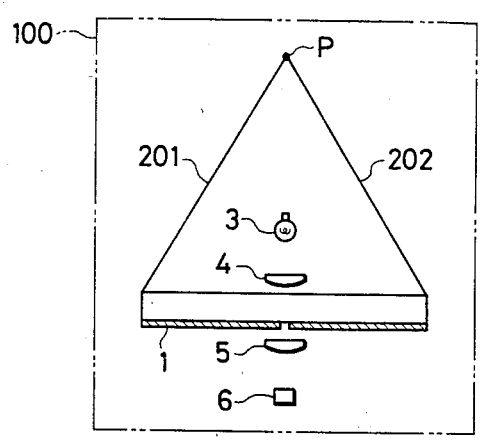
FIG. 1 is a schematic view of the position detecting device of the present invention provided in a surveying instrument.
Figure 3:
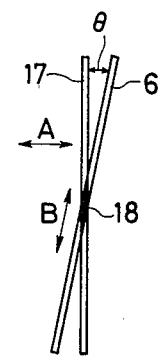
FIG. 3 is a schematic view showing the relationship between the projected image of a slit and the image sensor in first and second embodiments of the present invention.

Now reference is made to FIGS. 1 and 3 showing a first embodiment of the present invention, applied to a surveying instrument such as a level. In FIG. 1, a slit plate 1 having a slit perpendicular to the plane of the drawing is suspended by two wires 201, 202 from a point P in the body of a level 100. Said slit plate is illuminated by a light source 3 and a condenser lens 4 fixed in the level, and an image 17 of said slit is formed on an image sensor 6 by a projection lens 5 as shown in FIG. 3. Said image sensor 6 is fixed in the level 100 with an angle $\theta$ to the projected slit image 17. When the level 100 is inclined in the plane of the drawing, the projected image 17 moves in a direction A with respect to the level 100, so that the crossing area 18 of the image sensor 6 and the projected image 17 moves in a direction B. The ratio of the displacement of the crossing area 18 in the direction B to that of the projected image 17 in the direction A is equal to $1/\sin\theta$. In this manner the precision of the positional detection is improved by enlarging the displacement of the slit plate 1 by the magnification of the projection lens 5 and then by the angle $\theta$.

Figures 2, 7:
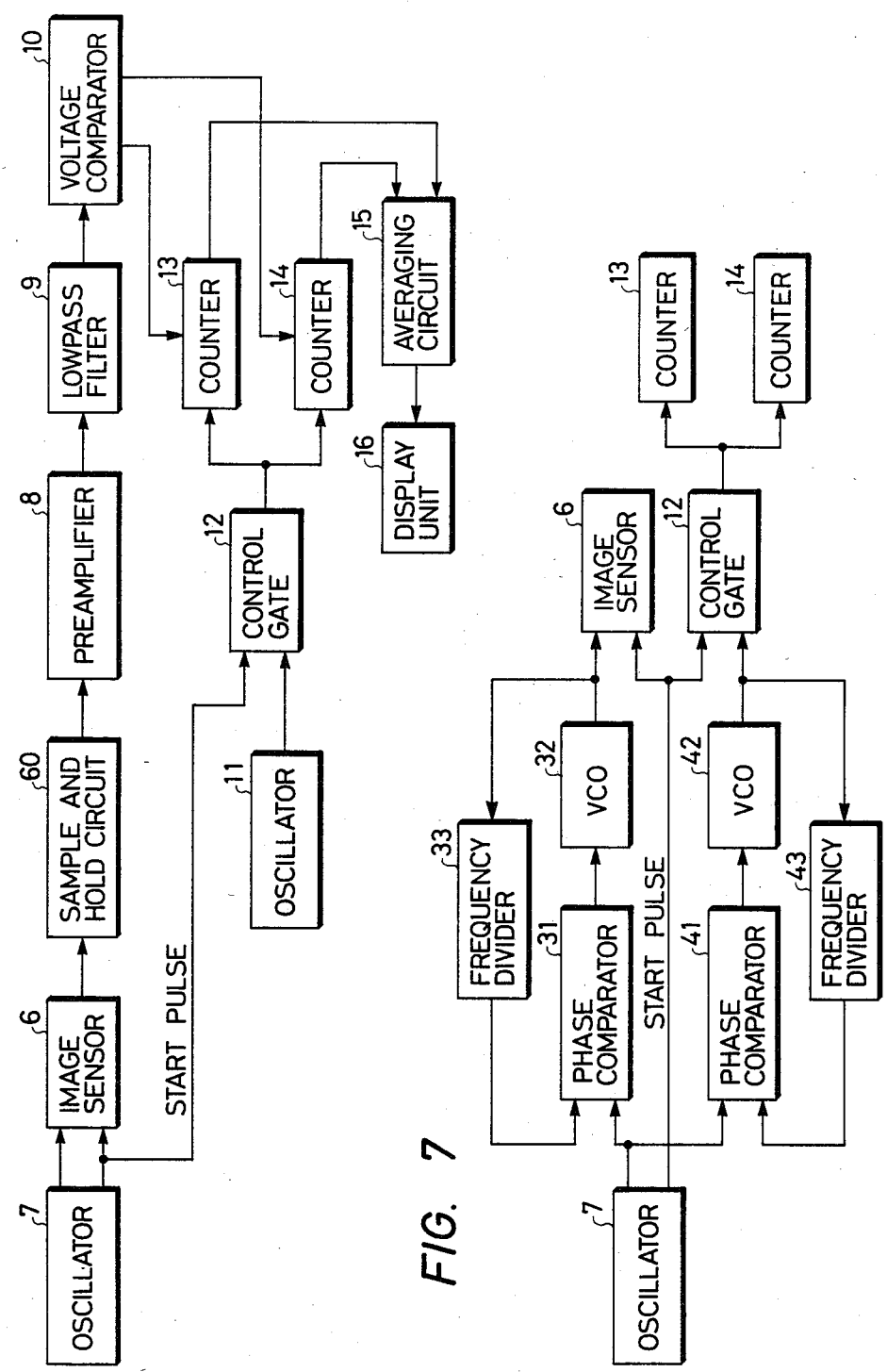
FIG. 2 is a block diagram showing a first embodiment of the present invention.
FIG. 7 is a block diagram showing a second embodiment of the present invention.

As shown in FIG. 2, the image sensor 6 is activated in the known manner by a start pulse supplied from an oscillator 7 at a time $t_0$, and the elements of said sensor are driven in succession by subsequently supplied clock pulses. In this manner the image sensor 6 supplies signals corresponding to the quantities of light entering the elements in the form of a pulse train to a sample-and-hold circuit 60, which extends said pulses to generate step-shaped digitized signals as shown by solid lines 19, 22 in FIGS. 4A and 4B. The output signals of said sample-and-hold circuit 60 are supplied, after amplification in a pre-amplifier 8, to a low-pass filter 9, which is so designed as to convert the above-mentioned digitized signals into analog signals shown by chain lines 20, 23 in FIGS. 4A and 4B. The cut-off frequency of said low-pass filter 9 is experimentally determined at a value lower than the frequency of the clock pulses. A voltage comparator 10 is provided with a suitable threshold voltage represented by 21 in FIG. 4A and is designed to supply a pulse P1 to a counter 13, at a time $t_1$, when the output voltage of the low-pass filter 9 becomes higher than said threshold voltage, and to supply a pulse P2 to a counter 14, at a time $t_2$, when said output voltage becomes lower than said threshold voltage. In response to the start pulse from the oscillator 7, a control gate 12 supplies clock pulses of an oscillator 11 for positional measurement into the counters 13, 14. Consequently the pulse count of the counter 13 corresponds to a period from $t_0$ to $t_1$, while that of the counter 14 corresponds to a period from $t_0$ to $t_2$. The output signals from the counters 13, 14 are supplied to an averaging circuit 15 and averaged therein. Consequently the output signal of said averaging circuit 15 represents the average value of the periods counted respectively by the counters 13, 14, corresponding to a period from the time $t_0$ to a time $t_3$ representing the peak position of a chain-lined curve 20 shown in FIG. 4A. The output signal from the averaging circuit 15 is supplied to a display unit 16. Thus, with reference to FIG. 3, the period from the time $t_0$ to $t_3$ corresponds to a distance from an end of the image sensor 6 to the center of the crossing area 18, and also corresponds to the inclination of the body of the instrument. It is therefore possible to display the inclination of the instrument in the plane of the drawing by means of the display unit 16.

Figure 4A:
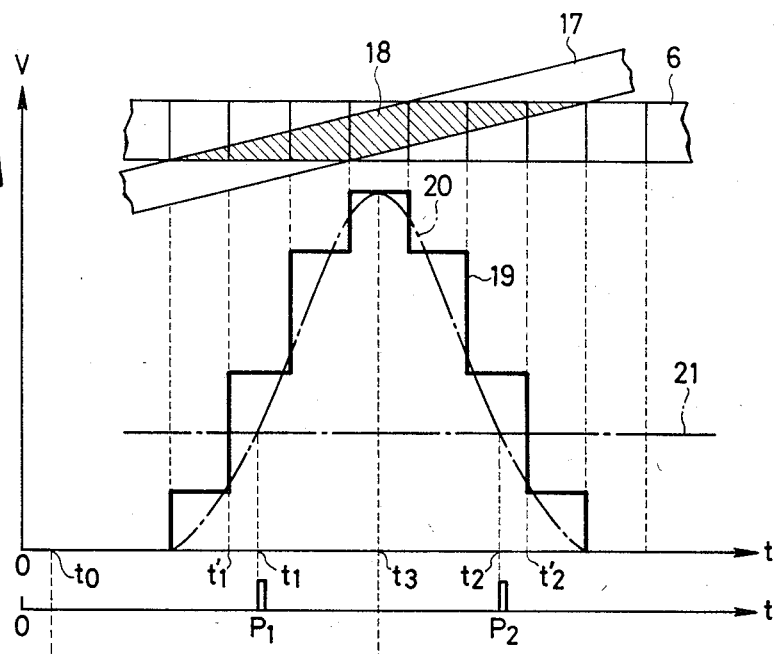
FIG. 4A is a chart showing the input and output waveforms of the filter in a certain relationship of the projected slit image and the image sensor in the first and second embodiments of the present invention.
Figure 4B:
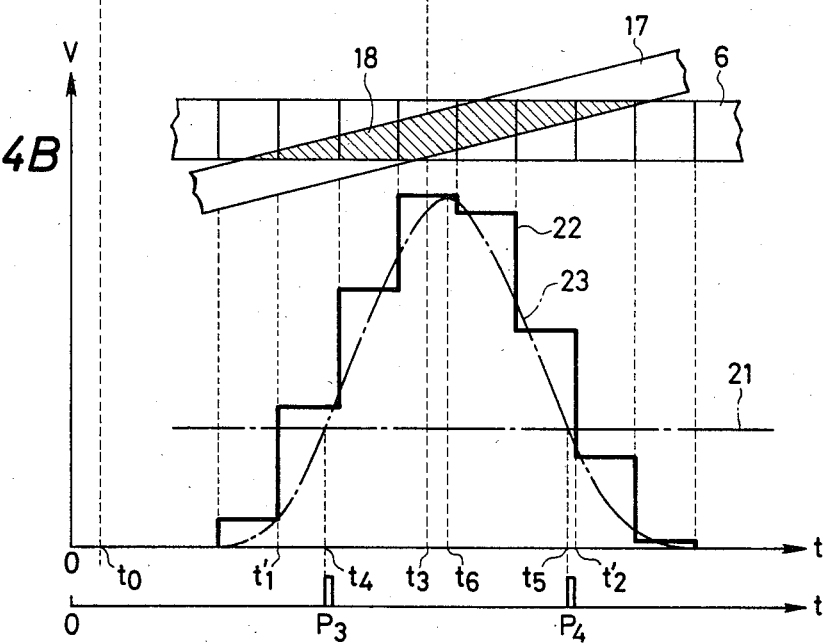
FIG. 4B is a chart showing the input and output waveforms of the filter when the projected slit image is moved from the position shown in FIG. 4A.

Now reference is made again to FIGS. 4A and 4B. Through the sample-and-hold circuit 60 the image sensor 6 provides step-shaped digitized waveforms 19, 22 since the image sensor 6 is composed of plural elements and the crossing area 18 of said image sensor 6 and the projected slit image 17 assumes a form as illustrated. In the case of FIG. 4A, the voltage comparator 10 receives the output signal 20 from the low-pass filter 9 and generates pulses at the crossing points, at times $t_1$ and $t_2$, of said signal with a suitable threshold voltage 21 selected below the peak value of the signal 20. The pulse P1 generated at $t_1$ is supplied to the counter 13, while the pulse P2 generated at $t_2$ is supplied to the counter 14. The function of said counters 13, 14 is already explained in the foregoing. In the case of FIG. 4B in which the position of the area 18 is different from that in FIG. 4A, the pulses P3, P4 are supplied to the counters 13, 14 at different moments.

In the case of FIG. 4A, in which the input waveform 19 is symmetrical as illustrated, the peak position determined from the crossing points of the input waveform 19 with the threshold voltage 21 at times $t_1'$, $t_2'$ is the same as the peak position determined from the waveform 20 and the threshold voltage. The peak value remains in the same element unless the projected image 17 moves, from the position shown in FIG. 4A, a distance in excess of a half of the element length. More specifically, in the case of FIG. 4B wherein the peak value remains in the same element despite movement of the projected image 17 by ⅓ of the element length from the position shown in FIG. 4A, the peak position determined from the crossing points of the waveform 22 with the threshold value is the same as that determined in FIG. 4A. Stated differently the peak position determined from the output signal of the image sensor 6 as represented by the waveform 19 or 22 and the above-mentioned threshold voltage is always positioned at a boundary or at the center of an element, thus being inadequate for precise determination of the position of the projected image 17. On the other hand, the peak position of the output signal of the low-pass filter 9, as represented by the waveform 23 in FIG. 4B, continuously corresponds to the position of the projected image. In this manner the presence of the low-pass filter 9 eliminates the dependence of the resolving power on the length of each element.

The position detecting device of the above-described structure allows, when incorporated in a surveying instrument, indication of the inclination of the instrument from the absolute horizontal plane with an extremely high precision, and the inclination thus determined can be used as a correction factor automatically in the course of data processing.

It is to be understood that the peak position of the output waveform 20 of the low-pass filter in FIG. 4A is assumed to coincide with the center of the crossing area 18 on the image sensor 6 for the purpose of simplicity in explanation. In practice, however, the output waveform 20 has the same areas as that of the input waveform 19 of the low-pass filter and is positioned to the right in the drawing with respect to the center of the crossing area 18. Stated differently, the waveform 20 is delayed from the waveform 19 because of the circuit structure, and the amount of said delay becomes larger as the cut-off frequency of the low-pass filter 9 is reduced. It is experimentally confirmed that the peak position of the waveform 20 from the low-pass filter 9 is displaced from the center of the crossing area 18 on the image sensor 6 by approximately 1/10 of one element thereof, in case the image sensor 6 receives clock pulses of a frequency of 240 KHz and the cut-off frequency of the low-pass filter 9 is selected as 40 KHz. Such displacement does not however constitute a problem since the position detecting device of the present invention is used for measuring the relative position. The foregoing explanation applies also to the output waveform 23 of the low-pass filter shown in FIG. 4B.

Figure 5:
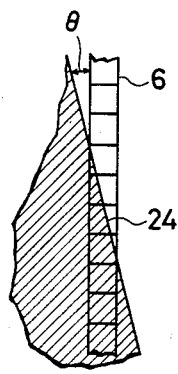
FIG. 5 is a schematic view showing an image of an optical edge projected on the image sensor.

The principle of determining the position of a slit image explained in the foregoing embodiment is also applicable for determining the position of an edge image as shown in FIG. 5, wherein a boundary line 24 between a light area and a dark area is positioned with an angle $\theta$ to the image sensor 6 for the same purpose as in the first embodiment. The hatched area indicates the dark area.

Figure 6:
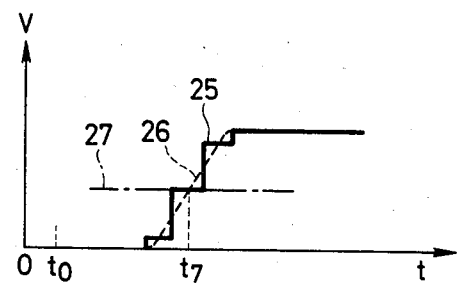
FIG. 6 is a chart showing the input and output waveforms of the filter in the arrangement shown in FIG. 5.

FIG. 6 shows the relationship of an input waveform 25 and an output waveform 26 of the low-pass filter 9, and a threshold voltage 27 in the embodiment shown in FIG. 5. The processing circuit for the wave-forms shown in FIG. 6 does not require the counter 14 and the averaging circuit 15 shown in FIG. 2. In the present example the elements of the image sensor are driven in succession by clock pulses sequentially supplied from a time $t_0$ in the same manner as already explained in relation to FIG. 2. In FIG. 6, time $t_7$ where the output waveform 26 crosses a threshold voltage 27 selected lower than the peak value of said output waveform 26 corresponds to the position of said edge, and the counter 13 counts the pulses from the time $t_0$ to $t_7$ thereby to display the position or angle of the edge on the display unit 16 corresponding to the number of counted pulses. Also in this case it is to be noted that the output waveform 26 of the low-pass filter 9 is different from the actual waveform as already explained in relation to FIGS. 4A and 4B.

Figure 8:
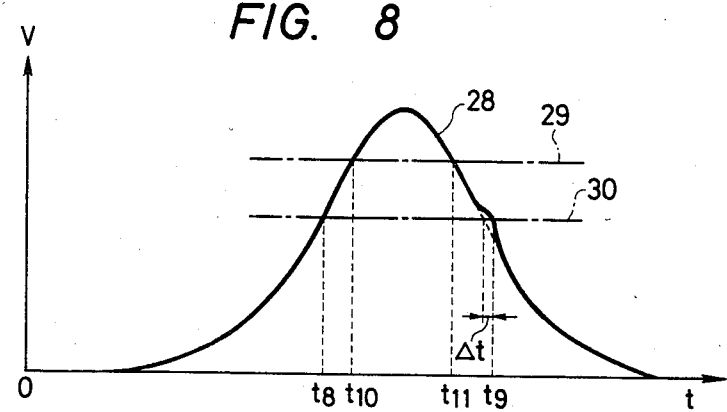
FIG. 8 is a chart showing a filter output waveform involving noises resulting from uneven sensitivities of the elements of the image sensor or from dust.

FIG. 7 is a block diagram of a second embodiment of the present invention, in which in contrast to the first embodiment utilizing two oscillators 7, 11 as shown in FIG. 2, the clock pulse frequency of an oscillator 7 is converted into two different frequencies by means of two phase-locked loops consisting of phase comparators 31, 41, voltage controlled oscillators 32, 42 and frequency dividers 33, 43. The signal processing system after the image sensor 6 and the control gate 12 is the same as that employed in the first embodiment. Assuming that the frequency dividers 33, 43 are respectively $N_1$- and $N_2$-dividers and that the clock pulses generated by the oscillator 7 have a frequency $f_0$, the image sensor 6 receives clock pulses of a frequency $N_1 f_0$ and the counters 13, 14 receive clock pulses of a frequency $N_2f_0$ through the control gate 12. The precision of positional measurement can be improved by so adjusting the frequency dividers 33, 34 as to reduce the value of the ratio $N_1/N_2$ As shown in FIG. 8, the output waveform 28 of the low-pass filter 9 in the first embodiment may involve distortions resulting from uneven sensitivity of the elements of the image sensor 6 or from dust. In such case the peak position $(t_8 + t_9)/2$ of the waveform 28 determined with a threshold voltage 30 contains an error $\Delta t/2$. In such case, however, it is possible to determine the peak position from a new threshold voltage 29 different from the above-mentioned threshold voltage 30 and to average said peak position with the peak position obtained from the above-mentioned threshold voltage 30, providing an average peak position $(t_8+t_9+t_{10}+t_{11})/4$ with an error $\Delta t/4$. In this manner the error resulting from distortions in the output waveform obtained through the sample-and-hold circuit of the low-pass filter 9 can be reduced by averaging the peak positions determined from plural threshold voltages.

In the foregoing embodiments, the cut-off frequency of the low-pass filter has to be at first selected lower than the frequency of the clock pulses, and is experimentally further reduced in order to obtain an optimum signal. It is furthermore possible to obtain a stabler signal by supplying the output signal of the sample-and-hold circuit through a band-pass filter satisfying the foregoing conditions and satisfying a condition to cut off the DC component.

Furthermore the present invention is applicable in a case where, different from the relationship between the image sensor and the projected image explained in the foregoing embodiments, the boundary between the dark and light areas of the projected image does not cover plural elements of the image sensor, namely even when said boundary is for example perpendicular to the direction of the image sensor. Stated differently, the boundary between the light and dark areas is not clear but contains an intermediate transition area between said light and dark areas because of the diffraction of light, and the present invention can be effective if said intermediate transition area occupies plural elements of the image sensor.

As explained in the foregoing, the present invention enables highly sensitive positional detection without limitation by the length of each element of the image sensor by means of an extremely simple mechanism while maintaining a high stability inherent to the positional detection with an image sensor. Also the device of the present invention, when applied for the measurement of displacement, is capable of attaining a high precision by detecting the positions of a projected pattern before and after the displacement.

We claim:

1. In a position detecting device for determining the position of a pattern having a light area and dark area by projecting said pattern on an image sensor provided with a linear array of plural photoelectric converting elements, reading the output signals of said photoelectric converting elements in response to clock pulses of a first frequency, and forming a hold signal by holding the output signals of said photoelectric converting elements during an interval of the clock pulses of said first frequency, thereby determining the position of said pattern on said image sensor; an improvement comprising:

(a) filter means for cutting off the frequency components of said hold signal at least above said first frequency and passing the remaining frequency components of said hold signal as an output signal;

(b) comparator means having a threshold level for comparing the output signal of said filter means with said threshold level and outputting a comparison signal in response to the result of said comparison; and (c) timer means for measuring the time to the outputting of said comparison signal from said comparator means.

2. A position detecting device according to claim 1, further comprising oscillator means for generating clock pulses of said first frequency and clock pulses of a second frequency higher than said first frequency, and wherein said timer means comprises counter means for counting the number of the clock pulses of said second frequency until the outputting of said comparison signal from said comparator means.

3. A position detecting device according to claim 1, wherein said pattern comprises a substantially linear boundary between said light and dark areas, and said boundary is so positioned as to cross said image sensor outputting angle to the direction of array of said photoelectric converting elements.

4. A position detecting device according to claim 2, wherein said oscillator means generates a start signal for starting the sequential outputting of the output signals from said image sensor;

said pattern is composed of light and dark areas of which at least either is placed between the other areas on said image sensor;

said comparator means generates two comparison signals for said threshold level when the level of the output signal of said filter means becomes substantially equal to said threshold level;

said counter means starts said counting in response to said start signal and counts the number of the clock pulses of said second frequency until the outputting of each comparison signal from said comparator means; and said timer means comprises means for determining the average of the numbers of counted clock pulses.

5. A position detecting device according to claim 2, wherein said oscillator means comprises:

an oscillator for generating clock pulses of a third frequency;

first converter means for converting the clock pulses of said third frequency into the clock pulses of said first frequency; and second converter means for converting the clock pulses of said third frequency into the clock pulses of said second frequency.

6. A position detecting device according to claim 5, wherein said oscillator means comprises adjusting means for varying the ratio of said first and second frequencies.

7. A position detecting device according to claim 2, wherein said oscillator means generates a start signal for starting the sequential outputting of the output signals from said image sensor;

said comparator means generates a first comparison signal when the output signal level of said filter means changes from a level lower than said threshold level to a level higher than said threshold level, and generates a second comparison signal when the output signal level of said filter means changes from the level higher than said threshold level to the level lower than said threshold level;

said counter means starts said counting in response to said start signal and counts the number of the clock pulses of said second frequency until the outputting of said first comparison signal from said comparator means and the number of the clock pulses of said second frequency until the outputting of said second comparison signal from said comparator means;

said timer means comprises means for determining the average of the numbers of counted clock pulses.

* * * * *